(No Model.)
J. D. F. ANDREWS.
ELECTRIC CONDUCTOR.
No. 451,605. Patented May 5, 1891.
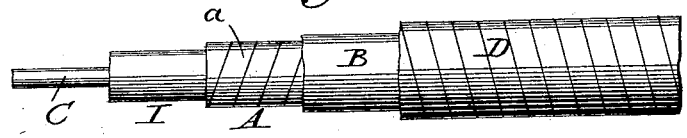
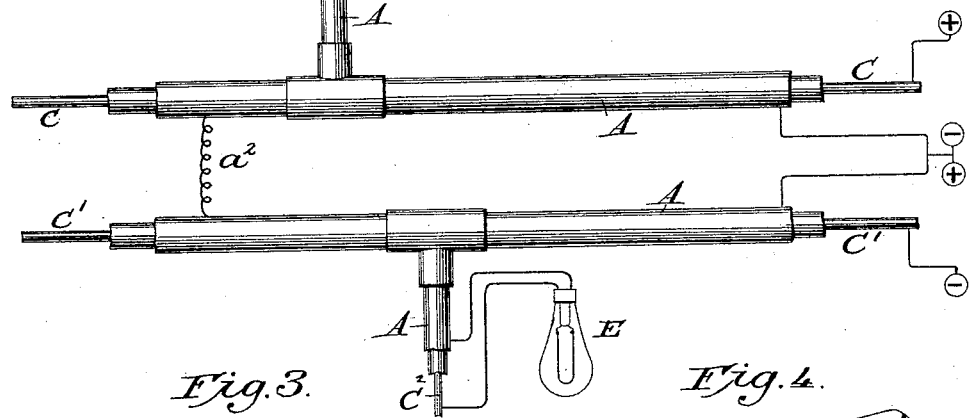
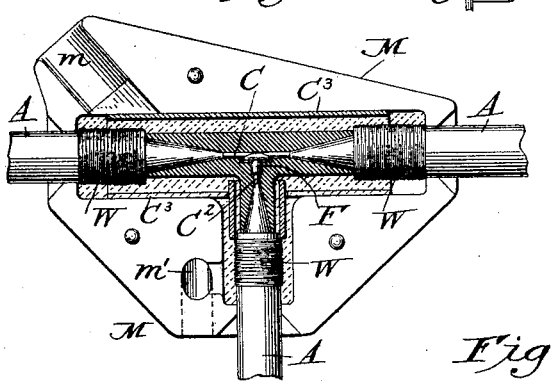
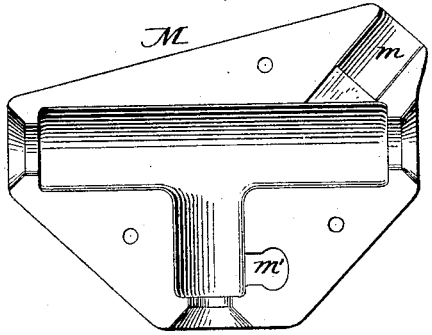
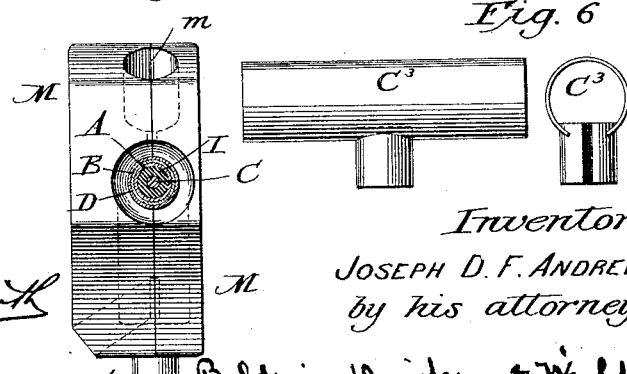
Attest.
Sidney P. Hollingworth
Baltus DeLong.
Inventor
JOSEPH D. F. ANDREWS
by his attorneys
Baldwin Davidson & Wight

UNITED STATES PATENT OFFICE.

JOSEPH D. F. ANDREWS, OF WESTMINSTER, ENGLAND.

ELECTRIC CONDUCTOR.

SPECIFICATION forming part of Letters Patent No. 451,605, dated May 5, 1891.

Application filed October 31, 1890. Serial No. 369,880. (No model.)

*To all whom it may concern:*

Be it known that I, JOSEPH D. F. ANDREWS, a subject of the Queen of Great Britain, and a resident of Westminster, in the county of Middlesex, England, have invented certain new and useful Improvements in Electric Conductors, of which the following is a specification.

My invention relates to the class of compound cables or armored electrical conductors; and its objects are to secure a perfectly-insulated water-tight conductor of maximum conducting capacity, to combine in the same cable a direct and return circuit, and to form joints therein or connections therewith at desired points without impairing its insulation or polarization. These ends I attain by a novel construction and organization of the cable and of the parts constituting its connections or joints, as hereinafter specified.

The accompanying drawings represent such parts as are necessary to illustrate the subject-matter, which parts, unless otherwise designated, are of usual construction.

Figure 1 is a detail view showing the core-wire, insulation, conducting-sheath, soft-metal covering, and tenacious armor of a single cable. Fig. 2 is a diagrammatic view showing two cables adapted to a three-wire system of electrical distribution and the circuit-connections. Fig. 3 is a view showing my improved mode of uniting a branch with a main line, and also a section of the mold used in forming the joint. Fig. 4 is a view of the inside of the other section of the mold. Fig. 5 is an end view of the mold, the cable being shown in section. Fig. 6 shows the sheath of conducting material used at the joint and between the cables. Fig. 7 shows the junction T-piece for connecting the branch to the copper core of the cable.

The cable is preferably constructed as follows: A central core or conductor C is inclosed in suitable insulating material I, in turn covered by armor A, preferably made of copper bands or tapes $a$, wound spirally over and upon the insulating material. This armor is preferably tinned before being wound upon the core-wire, and after such winding a coating or tube B, of lead or other soft metal, is formed by known methods around the armor-core, thereby uniting the convolutions of the armor and forming of them a continuous conducting-tube surrounding the central core C and its insulation I. To further protect the cable I wind on a layer of galvanized or tinned wire or tape D, preferably wound spirally, as indicated in Fig. 1.

In Fig. 2 I have shown the method of adapting my cable to electric distribution on the three-wire system. The terminals of the core-wires C C' are connected with the appropriate poles of the generators. The outer conductors are similarly united with their appropriate terminals. They are also connected at suitable intervals by cross-wires $a^2$ to insure greater equality of electric pressure. This figure of the drawings also shows electric lamps E in circuit with branch cores $C^2$, which are connected with the cores C C' in a manner hereinafter described, and the lamps are also connected with the armor A, which constitutes the return-conductor.

Fig. 3 represents my improved method of joining a main with a branch. The main conductor C and branch $C^2$ are securely connected by a T-piece F, (shown in Fig. 7,) into which the wires are soldered, brazed, or otherwise secured, the insulation having been first removed from the point of junction, as well as the armor A.

The T-piece F is formed with a trough-like head $f$, in which the copper core or cores are secured, and afterward the edges of the head are bent over and firmly united to the cores. The stem $f'$ of the T-piece is tubular, and in this is secured the core $C^2$ of the branch wire.

The armor and insulation are wrapped with wire W at points where they are cut away. This wire wrapping is especially useful where armor composed of spiral wires is employed. The intervening space is then filled with insulating material, which in case of rubber insulation is prepared for vulcanization. A sheath or tube $C^3$, preferably of copper, is applied so as to fill the gap between the cut-away portions of the armor. The joint is then laid in a suitable mold or junction-box M, divided longitudinally, so as to readily envelop the cable, and provided with suitable openings for the passage of the cable, as well as with pouring-gates $m\ m'$, which may be set at various angles relatively to the cable as the case requires. One gate will ordinarily answer the purpose, in which case the others may be omitted or closed. The mold, being clamped upon the joint, is filled with fusible metal, which entirely surrounds and effectually protects the joints, after which the mold may be removed.

Joints with any number of wires are made in a similar way; or I sometimes prefer to group the wires in parallel bunches and join the ends together as one wire. In some cases I make the mold of thin sheet metal, such as copper, and leave it in position, covering the joint, in which case I do not require the sheath previously referred to.

The mold may be heated before or after pouring in the fusible metal.

Having thus fully described my improved compound cable or electrical conductor, what I claim therein as new and as of my own invention is—

1. The combination, substantially as hereinbefore described, of the joined ends of the core-wires, their insulation and armor, the wires wrapped around the separated portions of the armor, the insulating-envelope, the conducting-sheath connecting the separated ends of the armor, and the metal cast around the whole in a mold.

2. The combination, substantially as hereinbefore set forth, of the main and branch wires, their insulating-envelope and inclosing armor, the insulating material covering the bared ends of the wire, the conducting sheath or casing connecting the separated ends of the armor, and the fusible metal within the case.

3. The combination, substantially as hereinbefore set forth, of the core-wire of the main cable, the branch core-wire, the T-piece connecting them, insulating material covering the T-piece and the bared portions of the cores, the sheet-metal casing having a removable stem, and the fusible metal within the casing.

4. The combination of the core-wire of the main cable, the branch core-wire, the T-piece connecting them, insulating material covering the bared portions of the core and the T-piece, insulating material covering the cores, a metallic armor outside the insulation, wires W, wrapped around the adjacent ends of the cables, and metallic connections between these wires W.

In testimony whereof I have hereunto subscribed my name.

J. D. F. ANDREWS.

Witnesses:
 OTIS KING,
 JOHN HARRISON.